United States Patent
Patel et al.

(10) Patent No.: US 7,209,283 B2
(45) Date of Patent: Apr. 24, 2007

(54) COMPACT OPTICAL AMPLIFIER WITH A FLATTENED GAIN PROFILE

(75) Inventors: Falgun D. Patel, Pacifica, CA (US); Jeffrey N. Miller, Los Altos Hills, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 101 days.

(21) Appl. No.: 10/819,666

(22) Filed: Apr. 7, 2004

(65) Prior Publication Data

US 2005/0225842 A1    Oct. 13, 2005

(51) Int. Cl.
*H01S 3/00*    (2006.01)
(52) U.S. Cl. .................................. 359/337.21
(58) Field of Classification Search ............ 359/337.21
See application file for complete search history.

(56) References Cited

U.S. PATENT DOCUMENTS

| | | | | |
|---|---|---|---|---|
| 5,271,024 A | * | 12/1993 | Huber | 372/6 |
| 5,434,702 A | * | 7/1995 | Byron | 359/337.21 |
| 5,473,622 A | * | 12/1995 | Grubb | 372/6 |
| 5,608,571 A | * | 3/1997 | Epworth et al. | 359/337.21 |
| 5,696,615 A | * | 12/1997 | Alexander | 398/92 |
| 5,710,659 A | * | 1/1998 | Cline | 359/337.21 |
| 6,122,096 A | * | 9/2000 | Fatehi | 359/337.21 |
| 6,141,142 A | * | 10/2000 | Espindola et al. | 359/337.21 |
| 6,356,387 B1 | * | 3/2002 | Ohishi et al. | 359/341.5 |
| 6,381,392 B1 | * | 4/2002 | Hayden et al. | 385/132 |
| 6,490,078 B2 | * | 12/2002 | Enomoto et al. | 359/341.1 |
| 6,496,303 B1 | * | 12/2002 | Fleming | 359/337.1 |
| 2004/0057471 A1 | * | 3/2004 | Shevy et al. | 372/6 |
| 2004/0208579 A1 | * | 10/2004 | Bendett et al. | 398/84 |

* cited by examiner

*Primary Examiner*—Deandra M. Hughes

(57) ABSTRACT

A flattened gain amplifier has a waveguide with a core doped with at least one species of rare earth ion. The rare earth ion has a gain profile with a first gain in a first wavelength band and a second gain in a second wavelength band. The flattened gain amplifier also has a first grating and a reflective element optically coupled to the core. The positions of the first grating and reflective element along the length define a first amplifying length and a second amplifying length. The ratio of the first amplifying length to the second amplifying length is about equal to the ratio of the second gain to the first gain.

20 Claims, 6 Drawing Sheets

COMPACT OPTICAL AMPLIFIER WITH A FLATTENED GAIN PROFILE

FIELD OF THE INVENTION

The technical field of this disclosure is optical components, particularly compact, rare earth doped optical amplifiers with flattened gain spectral profile.

BACKGROUND OF THE INVENTION

Optical amplifiers amplify light as it propagates within the amplifier. Optical amplifiers are used as repeaters, optical preamplifiers, and gain blocks within telecommunication systems in which optical fibers form the system backbone. Rare earth doped amplifiers, such as erbium doped fiber amplifiers, are often used in telecommunication systems. Optical amplifiers reduce the need for optical-to-electrical-to-optical conversion, in which optical signals are converted to electronic signals with a photodetector and the electronic signals are used to modulate a laser to regenerate the original optical signal. Optical-to-electrical-to-optical conversion is expensive. In wavelength division multiplexed systems using multiple wavelengths, regenerating equipment is required on a per channel or wavelength basis. Multiple signals at different wavelengths are often amplified several times as they propagate within the telecommunication system. There is a trend to transmit multiple signals each having a different wavelength within the C band of 1525.6 nm to 1562.5 nm, and the L band of 1569.4 nm to 1612.8 nm. Wavelength division multiplexing of signals provides a higher total transmission data rate for a telecommunication system.

The gain of rare earth doped amplifiers is the not flat across the wavelength range of the amplifier, but has asymmetrical peaks which reflect the fine structure of the energy levels of the rare earth ion. This is problematic when signals are distributed across the wavelength range of the amplifier. The signals and spontaneous emissions in high gain regions are amplified more than the signals and spontaneous emissions in low gain regions. Unequal amplification of the signals limits the number of wavelengths that can be transmitted through a system. To compensate, some telecommunication systems with erbium doped fiber amplifiers include a fiber with a loss profile that is the inverse of the gain spectra of the erbium doped fiber amplifiers. This flattens the gain of the system at the expense of increased signal losses, reduced signal-to-noise ratio and increased cost.

It would be desirable to have a compact optical amplifier with a flattened gain profile that would overcome the above disadvantages.

SUMMARY OF THE INVENTION

Embodiments of the invention equalize the gain of an optical amplifier for signals at different wavelengths using a waveguide doped with rare earth ions and by propagating the optical signals in specific regions of the gain profile of the rare earth ions through different amplifying lengths of the waveguide. A first signal at a wavelength in the high gain region of the gain profile propagates through a first amplifying length. A second signal at a wavelength in the low gain region of the gain profile propagates through a second amplifying length, greater than the first amplifying length. With proper design of the amplifying lengths, the signal in the lower gain portion of the gain profile is amplified by the same gain as the signal at the higher gain region of the gain profile after transmission through the amplifier.

One aspect of the present invention provides a flattened gain amplifier having a waveguide that has a core doped with at least one species of rare earth ion. The rare earth ion has a gain profile with a first gain in a first wavelength band and a second gain in a second wavelength band. The flattened gain amplifier also has a first grating and a reflective element optically coupled to the core. The positions of the first grating and reflective element along the length of the waveguide respectively define a first amplifying length and a second amplifying length. The ratio of the first amplifying length to the second amplifying length is about equal to the ratio of the second gain to the first gain.

Another aspect of the present invention provides a method for flattening gain of an optical amplifier. In the method, an amplifying waveguide having different gains per unit length in a first wavelength band and a second wavelength band is provided. Optical signals having wavelengths in the first wavelength band and in the second wavelength band are received at the waveguide. The signal in the first wavelength band is propagated though a first amplifying length of the waveguide and the signal in the second wavelength band is propagated through a second amplifying length of the waveguide.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENT

Figure 1:
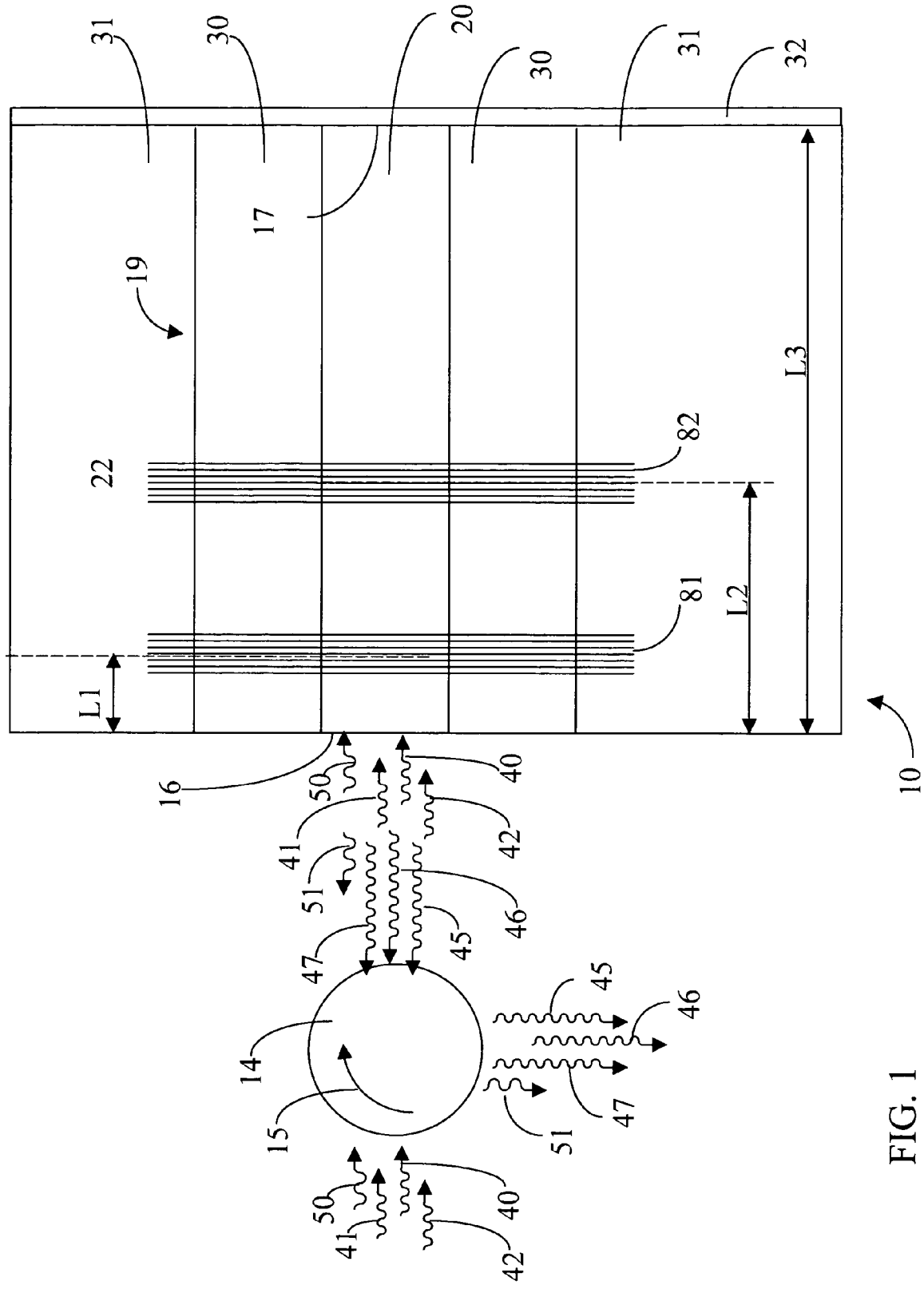
FIG. 1 shows a top view of a first embodiment of a flattened gain optical amplifier in accordance with the present invention.
Figure 2:
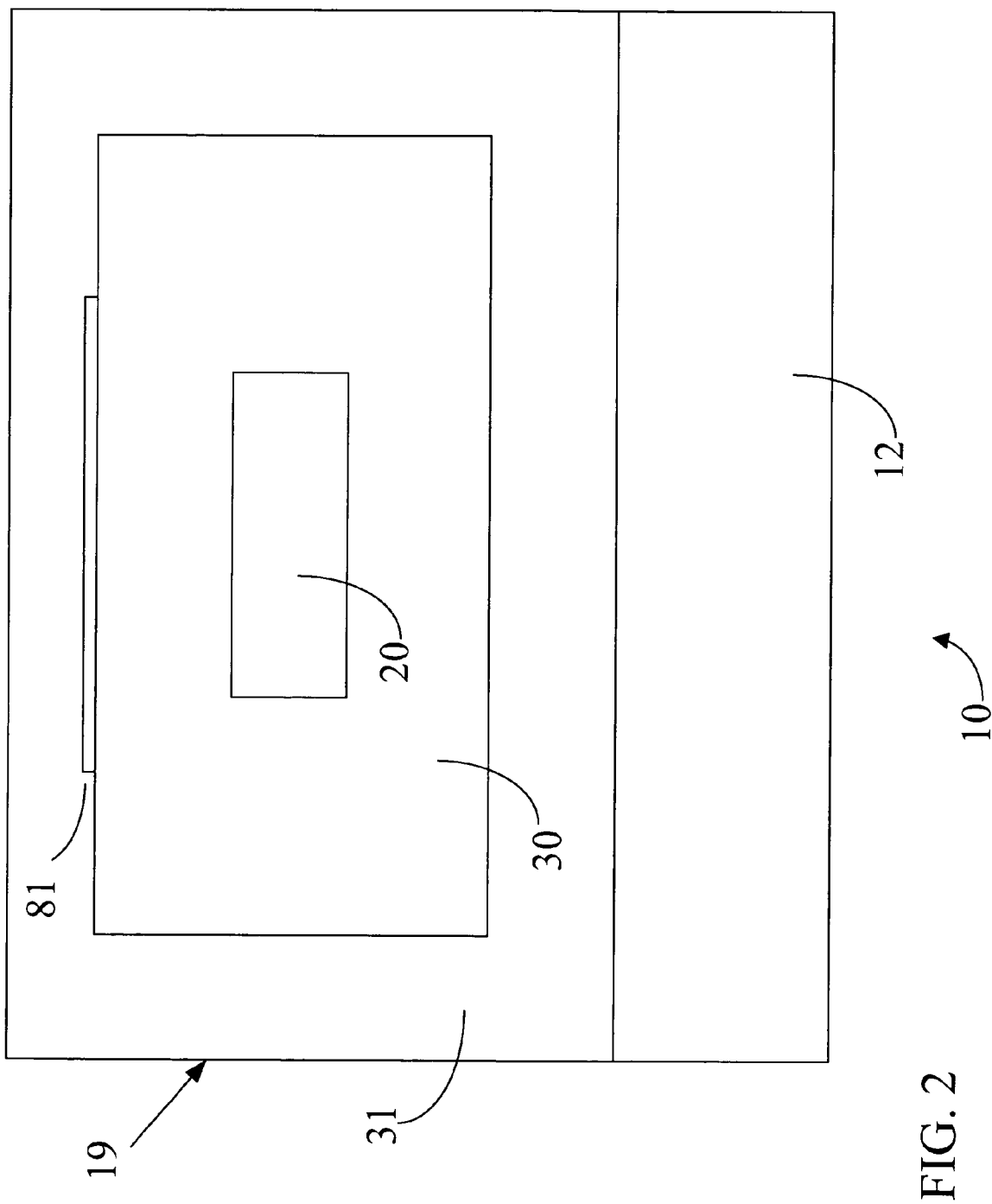
FIG. 2 shows a front view of a first embodiment of a flattened gain optical amplifier in accordance with the present invention.

FIGS. 1 and 2 show a top and a front view, respectively, of a flattened gain optical amplifier 10. Flattened gain optical amplifier 10 includes a waveguide 19 supported by substrate 12. The waveguide 19 includes a core 20 heavily doped with at least one type of rare earth ion (not shown), a first cladding 30, a second cladding 31, an input endface 16, and an output endface 17. The first cladding 30 surrounds the core 20 and has an index of refraction less than the index of refraction of the core 20. The second cladding 31 surrounds the first cladding 30 and has an index of refraction less than the index of refraction of the first cladding 30. The waveguide 19 supports propagation of one or more optical modes of radiation at a wavelength greater than a certain wavelength. A mirror 32 is located at the output endface 17 of waveguide 19 opposite and parallel the input endface 16. In an alternative embodiment, the waveguide 19 is a ridge-loaded waveguide, which is formed by depositing a layer of a lower index material of a desired width and length on a planar waveguide.

First sub-gratings 81 and 82 constitute a first grating and are optically coupled to the core 20. First sub-gratings 81 and 82 produce a spatially periodic modulation of the index of refraction of the core 20. First sub-gratings 81 and 82 reflect a specific wavelength or range of wavelengths, while transmitting other wavelengths. The first sub-grating 81 reflects a first optical signal 40 at a first wavelength. The first sub-grating 82 reflects a second optical signal 41 at a second wavelength. The first sub-gratings 81 and 82 are Bragg gratings, long period gratings or chirped gratings. A Bragg grating reflects an optical signal such as optical signals 40–42 directly back into the core 20 of the waveguide 19. A chirped grating reflects different wavelengths from different regions of the chirped grating.

The first sub-gratings 81 and 82 are positioned near the interface of first cladding 30 with second cladding 31. In an alternative embodiment, the first sub-gratings 81 and 82 are positioned near the interface of the core 20 with first cladding 30. In another alternative embodiment, the first sub-gratings 81 and 82 are positioned on the surface of the second cladding 31 at the interface of the second cladding 31 with air.

The materials of the first cladding 30 need not have the same index of refraction on all sides of the core 20. Similarly, the materials of the second cladding 31 need not have the same index of refraction on all sides of the first cladding 30. The indices of refraction of the cladding 30, the cladding 31 and the core 20, and the geometry of the core 20 all affect the modal structure of light at a wavelength $\lambda$ propagating in the waveguide. The geometry of the core 20 is set by the width and the thickness of the higher index material. For telecommunications applications, the waveguide 19 forming the flattened gain optical amplifier 10 is single mode in the wavelength range from 1.5 µm to 1.6 µm. Telecommunication systems generally use single mode fibers and laser sources in the C band of 1525.6 nm to 1562.5 nm and the L band of 1569.4 nm to 1612.8 nm.

In an alternative embodiment, the index of refraction of second cladding 31 is equal to the index of refraction of first cladding 30, so that first cladding 30 and second cladding 31 constitute one cladding surrounding the core 20. In other embodiments, either or both of the first cladding 30 and the second cladding 31 are additionally heavily doped with at least one type of rare earth ion.

A first optical signal 40, a second optical signal 41, and a third optical signal 42, each having a different wavelength, are coupled to the core 20 at the input endface 16 of waveguide 19. The optical signals 40–42 correspond in frequency to the three most probable spontaneous emission frequencies of the rare earth ions in the waveguide 19. An optical pump 50 is also coupled to the core 20 at the input endface 16 and excites the rare earth ions in the core 20.

The first optical signal 40 propagates in the waveguide 19 through the length L1. The first optical signal 40 is reflected by the first sub-grating 81 and propagates back through the length L1 to exit waveguide 19. The first optical signal 40 has a first gain as it is amplified in a first amplifying length of (2×L1) as a result of propagating the length of L1 twice. The first amplified optical signal 40 is output from endface 16 as first amplified output signal 45. The first amplified output signal 45 is transmitted through an optical circulator 14, which spatially separates the amplified output signals 45, 46, and 47 from the first, second and third optical signals 40, 41, 42, and is output. The curved arrow 15 in the optical circulator 14 indicates the directionality of the optical circulator 14.

The second optical signal 41 propagates in the waveguide 19 through the length L2. The first sub-grating 81 transmits the second optical signal 41, which is reflected by the first sub-grating 82. The second optical signal 41 has a second gain as it is reflected and propagates back through the length L2 to exit waveguide 19. The second optical signal 40 is amplified in a second amplifying length of (2×L2) as a result of propagating the length of L2 twice. The amplified second optical signal 41 is output from input endface 16 as second amplified output signal 46. The second amplified output signal 46 is transmitted through optical circulator 14 and is output.

The third optical signal 42 propagates in the waveguide 19 through the length L3. The length L3 is the complete length of amplifier 10. First sub-gratings 81 and 82 transmit third optical signal 42, which is reflected by mirror 32. The third optical signal 42 has a third gain as it is reflected by mirror 32 and propagates back through the length L3 to exit waveguide 19. The third optical signal 42 is amplified in a third amplifying length of (2×L3) as a result of propagating the length L3 twice. The amplified third optical signal 42 is output from input endface 16 as third amplified output signal 47. The third amplified output signal 47 is transmitted through optical circulator 14.

The optical amplifier 10 amplifies each of the optical signals 40–42 by a different gain as the optical signals propagate through different lengths of the waveguide 19. In a highly doped waveguide such as waveguide 19, a length in a range between 1 millimeter and 10 millimeters typically provides sufficient optical gain.

Glass is used as the material of the core and cladding, and to host the rare earth ions. Glasses are covalently bonded molecules in the form of a disordered matrix with a wide range of bond lengths and bond angles. Phosphate, tellurite, or borate glasses can accept a high concentration of rare earth ions, including $Er^{3+}$ ions. This higher solubility permits optical amplifier 10 to have a higher gain than conventional amplifiers. A phosphate, tellurite, or borate glass heavily doped with rare earth ions is the material of the core 20.

In an embodiment in which the core 20 is doped with the rare earth ions and the first cladding 30 is not doped with rare earth ions, the core 20 is structured to have an index of refraction higher than the index of refraction of the first cladding 30. In an alternative embodiment, phosphate, tellurite, or borate glasses are the materials of both the core 20 and the first cladding 30, and both the core and the first cladding are heavily doped with at least one rare earth ion. When the core 20 and the first cladding 30 are identically doped with rare earth ions, additional dopant or another index-changing material is injected or diffused into the core 20 to increase the index of refraction of the core 20 relative to the first cladding 30. In one embodiment, a patterned diffusion of silver atoms is used to increase the index of refraction of the core 20.

In an embodiment in which the core 20 and the first cladding 30 are doped with different rare earth ions, the combination of rare earth ions is selected so the core 20 has a higher index of refraction than the first cladding 30. In this way, the core 20 can support at least one mode of optical signals 40–42 and optical pump 50.

The amplification of optical signals 40–42 at a given wavelength results from the interaction of the optical pump 50 with the rare earth ions. The rare earths, also known as the lanthanides, range from lanthanum with an atomic number of 57 to lutetium with an atomic number of 71, and are lanthanum, cerium, praseodymium, neodymium, promethium, samarium, europium, gadolinium, terbium, dysprosium, holmium, erbium, thulium, ytterbium, and lutetium. Ionization of the rare earths normally forms a trivalent state. For example, the rare earth ion erbium ($Er^{3+}$) has a three level system with stimulated emission transitions at 0.80 µm, 0.98 µm, and 1.55 µm wavelengths.

Phosphate, tellurite, or borate glasses can accept 5 to 75 wt % of a single species of rare earth ion without precipitation. To prevent the formation of ion clusters, a second species of rare earth ion can be added as a second dopant to the glass. This is desirable since ion clusters promote ion self-interactions in which the absorbed optical pump power 50 is exchanged between clustered ions and does not contribute to amplification of the optical signal 40. Pump power absorbed to excite ion self-interactions depletes the pump power available for amplification. Amplification is quenched if too many ion clusters form.

If the doping level of the second species of rare earth ion is about equal to that of the first species, the second species will decrease the probability of ion cluster formations of either species. A rare earth ion of either species is half as likely to be positioned next to a rare earth ion of the same species. The probability of large ion clusters forming is reduced even more. Thus, mixing different species of rare earth ions reduces ion cluster formations of either species.

In addition, the absorption cross section of the optical pump power 50 in glass doped with more than one species of rare earth ion is larger than the absorption cross section of the optical pump power 50 of the species alone. By doping a phosphate, tellurite or borate glass with two or more species of rare earth ion, more optical pump power 50 is absorbed to provide amplification for optical signals 40–42.

Various rare earth doping concentrations in the core 20 can be used in optical flattened gain optical amplifier 10. In one embodiment, the core 20 of the flattened gain optical amplifier 10 is doped with $Er^{3+}$ in the range of 5 to 75 wt %. In another embodiment, the core 20 of the flattened gain optical amplifier 10 is doped with $Er^{3+}$ in the range of 5 to 30 wt %. Typically, the core 20 of the flattened gain optical amplifier 10 is doped with $Er^{3+}$ in the range of 7 to 9 wt %. This dopant level is high enough to produce amplification in a short length of amplifier.

In one embodiment, the core 20 of the compact flattened gain optical amplifier 10 is doped with $Er^{3+}$ in the range of 5 to 75 wt % and $Yb^{3+}$ in the range of 7 wt % to 35 wt %. In another embodiment, the core 20 of the compact flattened gain optical amplifier 10 is doped with $Er^{3+}$ in the range of 5 to 30 wt % and $Yb^{3+}$ in the range of 7 wt % to 35 wt %. Typically, the core 20 of the flattened gain optical amplifier 10 is doped with $Er^{3+}$ in the range of 7 to 9 wt % and with $Yb^{3+}$ in the range of 11 to 13 wt %.

The first sub-gratings 81 and 82 are formed by masking the second cladding 31, first cladding 30 or core 20 with photoresist and etching second cladding 31, first cladding 30 or core 20 surface, respectively. Alternately, the first sub-gratings 81 and 82 are formed by depositing a thin-film grating pattern on or in second cladding 31, first cladding 30 or core 20.

The first sub-gratings 81 and 82 are generally created in the photoresist using an optical interference or holographic exposure process. In a holographic process, the photoresist is exposed using an interference pattern generated by combining two coherent laser beams directed at the surface. The two coherent laser beams are typically obtained from one laser using a beam splitter. Once the photoresist is exposed, it is developed using standard methods to produce the required mask on the surface of the core 20 or first cladding 30. Either chemical or ion beam etching is used to produce the gratings following standard processing procedures.

Figure 3:
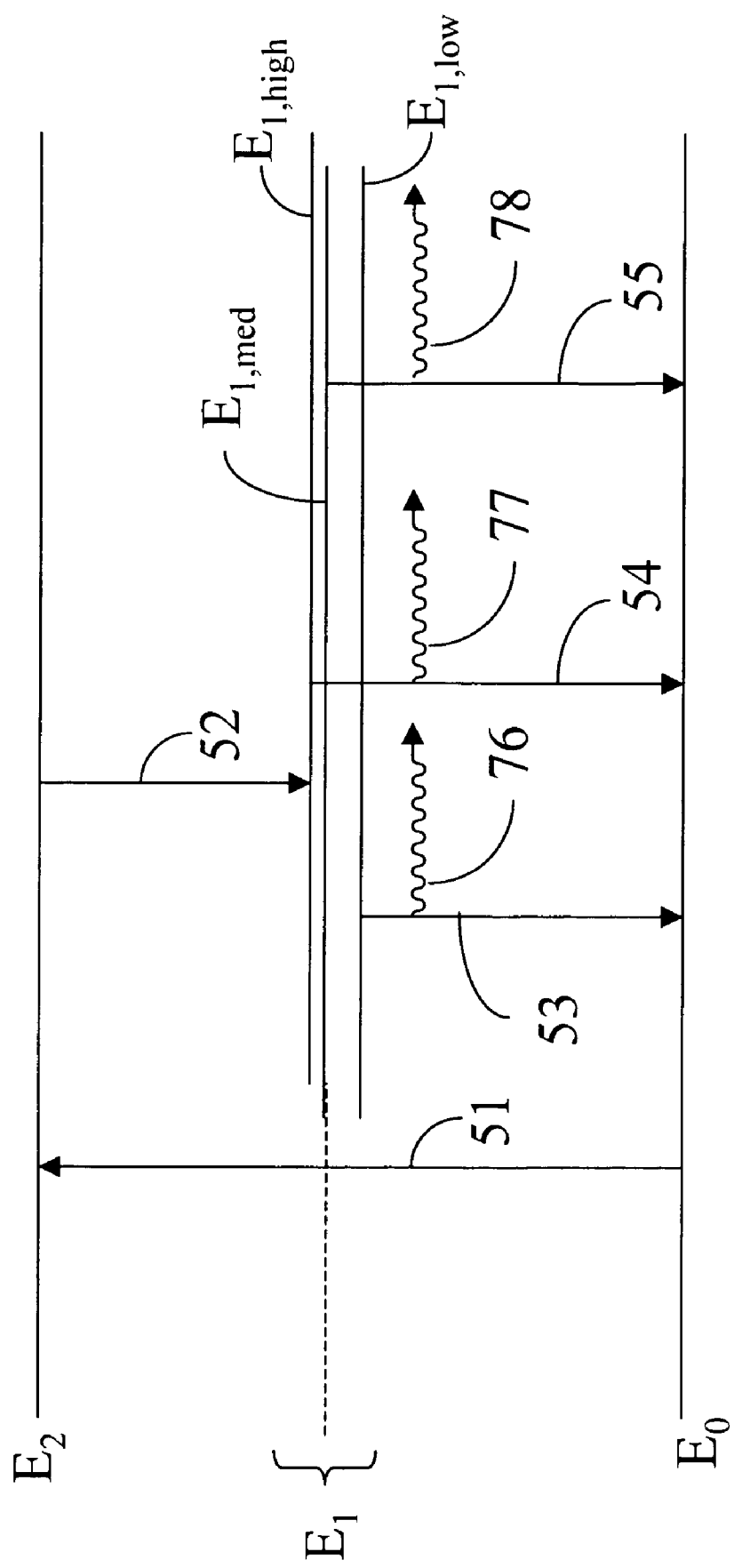
FIG. 3 shows an energy diagram of the three level system with some fine structure for an exemplary ion.

FIG. 3 shows an energy diagram of the three level system with some fine structure for an exemplary ion or atom. An optical pump 50 of appropriate wavelength, such as 0.98 µm for erbium, excites the ion from the ground state $E_0$ to the energy level $E_2$, as illustrated by arrow 51. The ion experiences a rapid decay from energy level $E_2$ to the energy level $E_1$, as illustrated by arrow 52. The level $E_1$ is generically shown as three distinct levels, representing fine structure of this energy level. From the lowest $E_1$ energy level, $E_{1,low}$, the ion drops to the ground state $E_0$ as illustrated by arrow 53, emitting a photon 76. From the highest $E_1$ energy level, $E_{1,high}$, the ion drops to the ground state $E_0$ as illustrated by arrow 54, emitting a photon 77 having a wavelength shorter than the wavelength of photon 76. From the middle $E_1$ energy level, $E_{1,mid}$, the ion drops to the ground state $E_0$ as illustrated by arrow 55, emitting a photon 78 having a wavelength intermediate between the wavelength of photon 76 and the wavelength of photon 77. The multiple energy levels provide the spontaneously emitted photons with an energy distribution. There is a specific probability of the ion decaying from energy level $E_2$ to each of the distinct energy levels within level $E_1$. These differing probabilities emit a gain profile that is not flat, since photons 76, 77 and 78 have a different probability of stimulated emission.

The optical signals 40, 41 and 42 at wavelengths within the gain range of the waveguide doped with an exemplary rare earth ion may co-propagate with an optical pump 50 in a core 20 heavily doped with the rare earth ions. When the optical pump 50 is at the wavelength needed to excite the rare earth atom, the optical signals 40, 41 and 42 are amplified after propagating a short distance by the photons 78, 76, and 77, respectively, emitted when the ion drops into the ground state $E_0$. The higher the level of doping of the rare earth ions in the core of the waveguide, the higher the amplification per unit length of the waveguide 19 and the shorter the waveguide 19 needs to be to provide a desired amount of amplification.

The first sub-grating 81 is structured to reflect at the wavelength of photon 78. The second sub-grating 82 is structured to reflect at the wavelength of photon 76. The mirror 32 reflects at all the wavelengths including at the wavelength of photon 77, which are transmitted by both first sub-gratings 81 and 82. In this example, optical signals 40, 41 and 42 are at the wavelengths of photon 78, photon 76 and photon 77, respectively.

Figure 4:
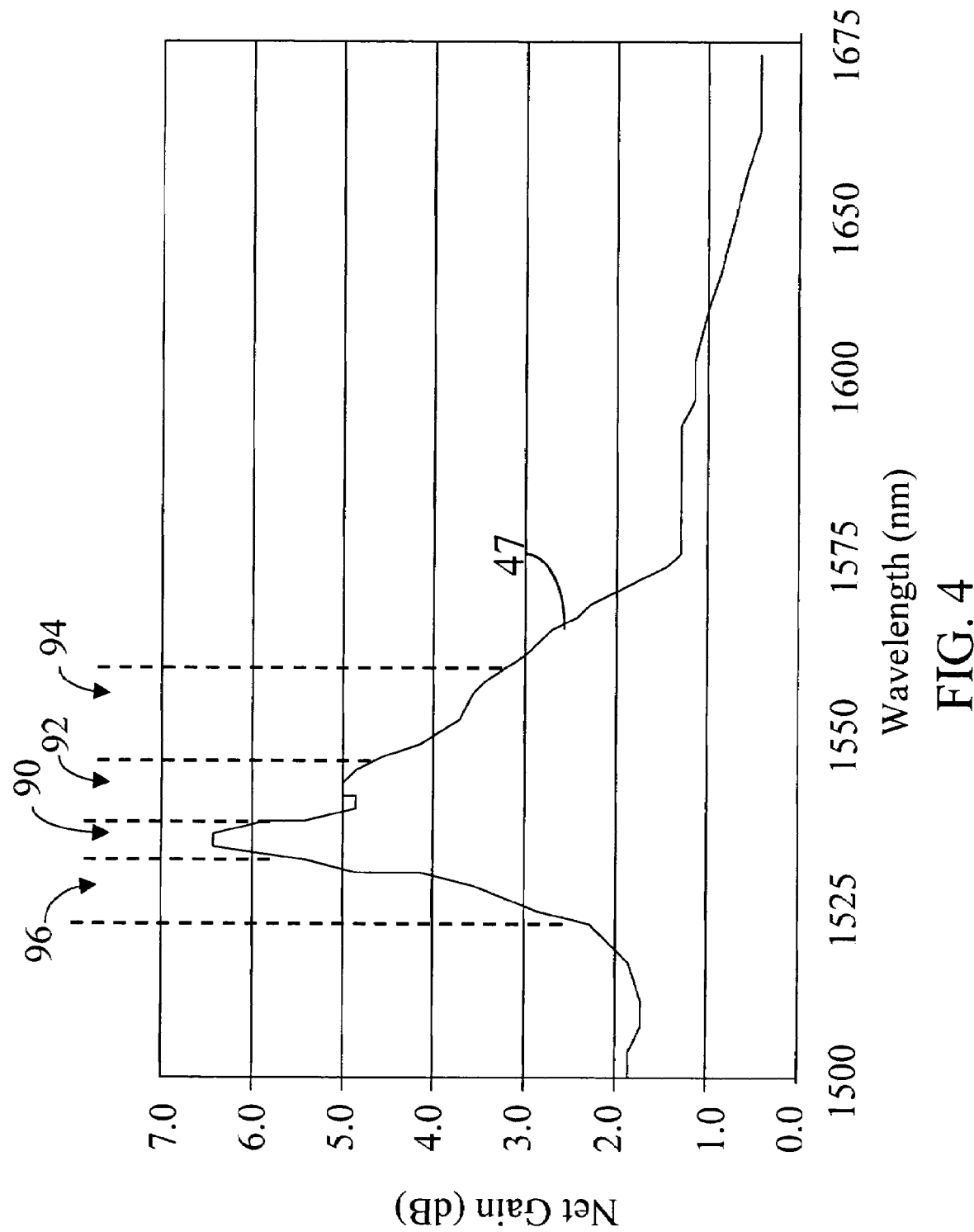
FIG. 4 shows gain spectra for a rare earth doped waveguide divided into wavelength bands.

FIG. 4 shows the theoretical gain profile 47 of a waveguide optical amplifier formed from phosphate glass doped with about 8 wt % Er3+ and about 12 wt % $Yb^{3+}$. Such phosphate glass is available from Schott Corporation (number IOG-1).

The theoretical gain profile 47 is divided into wavelength bands 90, 92, 94 and 96. First wavelength band 90 between 1533 nm and 1537 nm has an average gain of more than 6 dB. Second wavelength band 92 between 1537 nm and 1546 nm has an average gain of about 5 dB. Third wavelength band 94 between 1546 nm and 1560 nm has an average gain of about 3.5 dB. Fourth wavelength band 96 between 1524 nm and 1533 nm is the segment of the gain curve with a large slope. At the short wavelengths of fourth wavelength band 96, the gain is about 2.5 dB; at the high wavelengths of fourth wavelength band 96, the gain is about 5.5 dB. A steeply sloped band of the gain profile, such as fourth wavelength band 96, can be further divided into several wavelength regions with narrow wavelength ranges so that the gain range in each region is smaller, i.e., the average gain better represents the gain in the region.

Referring additionally to FIG. 1, the exemplary case of an optical amplifier receiving signals of equal intensity, but different wavelengths, is presented below. The optical amplifier 10 receives the optical signals 40, 41 and 42, which have the same intensity. The gain per unit length of the optical amplifier 10 is different for each of the optical signals 40, 41 and 42, because of their differing wavelengths and the wavelength-dependent response of the rare earth ions.

The first sub-grating 81 is optically coupled with the core 20 of the flattened gain optical amplifier 10 to reflect the optical signal 40, which is at a wavelength in the high gain first wavelength band 90. The optical amplifier 10 produces a high gain $G_1(\lambda_1)$ per unit length over the short length of (2×L1) for the optical signal 40. The first sub-grating 82 is optically coupled with the core 20 of the flattened gain optical amplifier 10 to reflect the second optical signal 41, which is at a wavelength in the medium-gain second wavelength band 92. The optical amplifier 10 produces a medium gain $G_2(\lambda_2)$ per unit length over the medium length of (2×L2), greater than (2×L1), for the second optical signal 41. The mirror 32 reflects the third optical signal 42, which is at a wavelength in the low gain fourth wavelength band 96. The optical amplifier 10 produces low gain $G_3(\lambda_3)$ per unit length over the long length of (2×L3) greater than both (2×L1) and (2×L2), for the third optical signal 42.

The amplified output signals 45, 46 and 47 are all equal in intensity upon exiting waveguide 19 when the optical amplifier 10 is designed to satisfy the equations $$G_1(\lambda_1)/G_2(\lambda_2)=L2/L1$$

and $$G_1(\lambda_1)/G_3(\lambda_3)=L3/L1$$

and $$G_2(\lambda_2)/G_3(\lambda_3)=L3/L2,$$

In this exemplary case, the gains applied to optical signals in wavelength bands 90 and 92 have average ratios of 6/5. The first sub-grating 81 defining the first amplifying length of (2×L1) reflects the optical signal 40. The first sub-grating 82 defining the second amplifying length of (2×L2) reflects the second optical signal 41. When the ratio of lengths L1/L2 is 5/6 (the inverse of the average gain ratio), amplified optical signals 45 and 46 are equal in intensity.

The values shown in FIGS. 1, 3 and 4 are summarized in Table 1.

TABLE 1

| Relative Gain | λBand in Gain Profile | Relative λ | Optical Signal No. | Photon No. | Reflective Device | Amplifier Length |
|---|---|---|---|---|---|---|
| Medium-$G2(\lambda_2)$ | 92 | Long | 41 | 76 | Sub-grating 82 | 2 × L2 medium |

TABLE 1-continued

| Relative Gain | λBand in Gain Profile | Relative λ | Optical Signal No. | Photon No. | Reflective Device | Amplifier Length |
|---|---|---|---|---|---|---|
| High-$G1(\lambda_1)$ | 90 | Medium | 40 | 78 | Sub-grating 81 | 2 × L1 short |
| Low-$G3(\lambda_3)$ | 96 | Short | 42 | 77 | Mirror 32 | 2 × L3 long |

Figure 5:
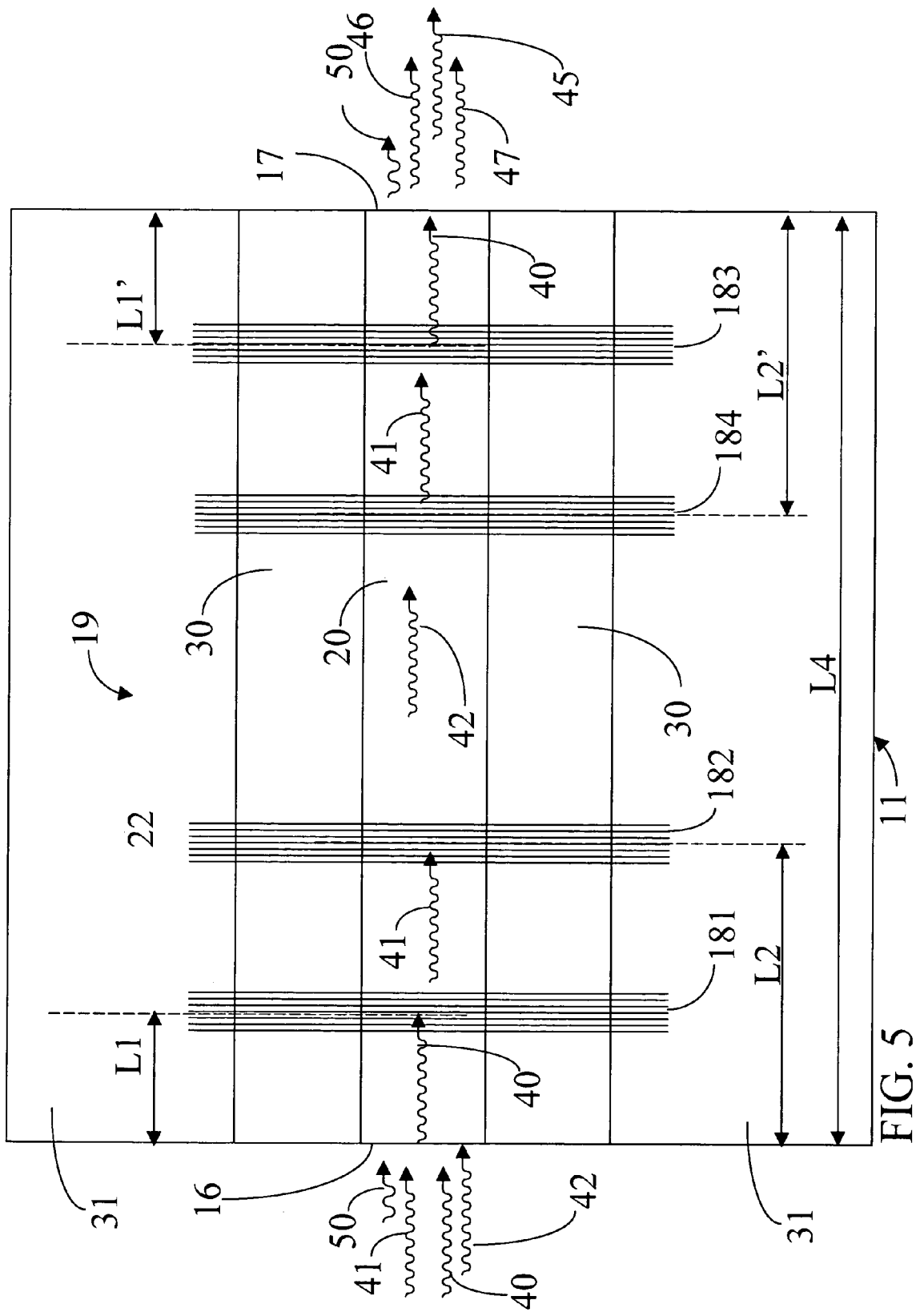
FIG. 5 shows a top view of a second embodiment of a flattened gain optical amplifier in accordance with the present invention.

FIG. 5, in which like elements share like reference numbers with FIGS. 1 and 2, shows a top view of a second embodiment of a flattened gain optical amplifier 11 in accordance with the present invention. In this embodiment, optical signals bypass part of the length of the waveguide. A first optical signal 40, a second optical signal 41, and a third optical signal 42, having different wavelengths but equal intensity, are coupled to the core 20 at the input endface 16 of waveguide 19. The gain per unit length of the optical amplifier 11 is different for each of the optical signals 40, 41 and 42, because of their differing wavelengths and the wavelength-dependent response of the rare earth ions. An optical pump 50 is also coupled to the core 20 at the input endface 16 and excites the rare earth ions in the core 20. First sub-gratings 181 and 182 constitute a first grating and are optically coupled to the core 20. First sub-grating 181 is structured to reflect the first optical signal 40 into the first cladding 30 of the waveguide 19. First sub-grating 182 is structured to reflect the second optical signal 44 into the first cladding 30 of the waveguide 19.

The first cladding 30 is surrounded by second cladding 31. The first cladding 30 transmits the first and second optical signals 40 and 41 reflected by first sub-gratings 181 and 182. The second cladding 31 has a cladding index of refraction less than the index of refraction of the first cladding 30. In this example, claddings 30 and 31 are not doped with rare earth ions, so the optical signals 40 and 41 are not amplified as they propagate in the first cladding 30. Second sub-gratings 184 and 183 constitute a second grating and are optically coupled to the core 20. Second sub-grating 184 is paired with first sub-grating 182. Second sub-grating 184 is structured to reflect second optical signal 41 back into the core 20 of waveguide 19. Second sub-grating 183 is paired with first sub-grating 181. Second sub-grating 183 is structured to reflect optical signal 40 back into the core 20 of waveguide 19. The third optical signal 42 is not reflected by any of the sub-gratings 181–184 but propagates the entire length L4 of the waveguide 19.

Each of the optical signals 40–42 is amplified while propagating through a different length of the core 19 in the optical amplifier 11. First optical signal 40 is amplified by propagating through the length (L1+L1'). Second optical signal 41 is amplified by propagating through the length (L2+L2'). Third optical signal is amplified by propagating through the length L4. In a highly doped waveguide such as waveguide 19, an overall length L4 in a range between 1 millimeter and 10 millimeters typically provides sufficient optical gain. The optical signals 40–42 exit the waveguide 19 from output endface 17 as amplified output signals 45–47.

The optical amplifier 11 is shown in FIG. 5 with L1=L1' and L2=L2'. In an alternative embodiment, optical amplifier 11 is structured so that L1 differs from L1' and L2 differs from L2'. In another alternative embodiment, the grating 184 is closer to output endface 17 than the grating 183. To flatten the gain profile of the amplified output signals 45–47, the lengths L1, L1', L2, L2' and L4 are selected to satisfy the following equations:

$$G_1(\lambda_1)/G_2(\lambda_2)=(L2+L2')/(L1+L1')$$

and $$G_1(\lambda_1)/G_3(\lambda_3)=L4/(L1+L1')$$

and $$G_2(\lambda_2)/G_3(\lambda_3)=L4/(L2+L2'),$$

where $G_i(\lambda_i)$ is the gain at the wavelength $\lambda_i$.

In an alternative embodiment, the optical pump 50 is coupled laterally into the waveguide 19, rather than being coupled into input endface 16. The first cladding 30 and the second cladding 31 collectively form a planar waveguide. The second cladding 31 covers the top and bottom surfaces of the planar waveguide of the first cladding 30. A portion of the optical pump 50 is transmitted through the core 19. Lateral coupling of the optical pump 50 eliminates the need to strip the optical pump 50 from the amplified signals at the output endface 17 of the flattened gain optical amplifier 11.

Figure 6:
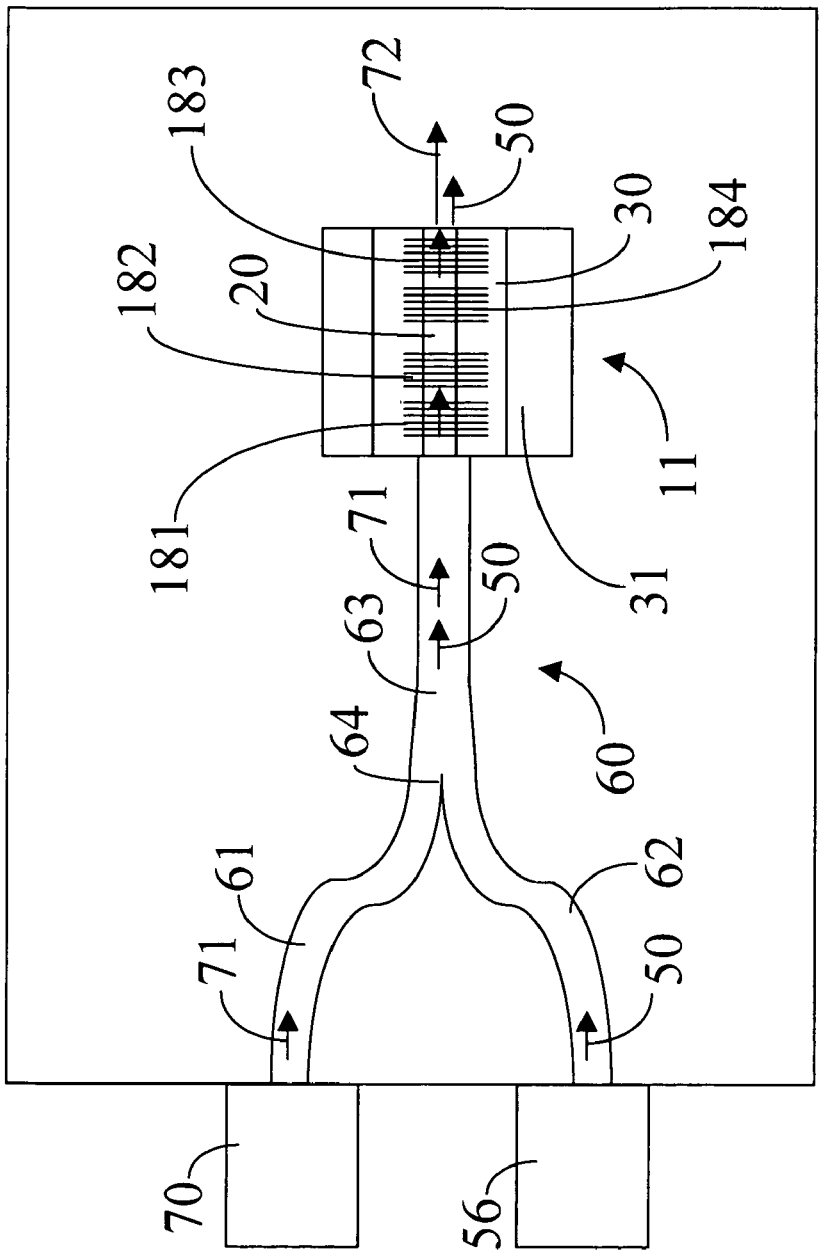
FIG. 6 shows a top view of an arrangement for coupling optical sources to the flattened gain optical amplifier of FIG. 5.

FIG. 6 shows a top view of an arrangement for coupling the signal source 70 and the pump source 56 to the flattened gain optical amplifier 11 of FIG. 5. Y-branch waveguide 60 has waveguide coupling arms 61 and 62 that merge at a Y-junction 64 with a waveguide branch 63.

Optical pump 50 emitted from optical pump source 56 is coupled to waveguide coupling arm 62 of the Y-branch waveguide 60. Optical signal 71 is coupled to waveguide coupling arm 61 of the Y-branch waveguide 60. Optical signal 71 emitted from signal source 70 has, in an example, a first optical signal 40 at a first wavelength, a second optical signal 41 at a second wavelength and a third optical signal 42 at a third wavelength. In one embodiment, the signal source 70 is an optical fiber carrying signals from a communication system.

Both optical signal 71 and optical pump 50 propagate through the Y-junction 64 of the Y-branch waveguide 60 into the waveguide branch 63. The waveguide branch 63 couples the optical signal 71 and the optical pump 50 to the optical amplifier 11. The Y-branch 60 allows the multiple-wavelength optical signal 71 and the optical pump 50 to co-propagate in the core 20 of the optical amplifier 11.

The optical signal 71 is amplified by optical amplifier 11 and emitted from the output endface 17 as amplified signal 72. In the above example, the amplified signal 72 has a first amplified output signal 45, a second amplified output signal 46 and a third amplified output signal 47. When the intensities of the first optical signal 40, second optical signal 41 and third optical signal 42 are equal, the intensities of first amplified output signal 45, second amplified output signal 46 and third amplified output signal 47 are equal.

The waveguide branch 63 is butt-jointed coupled to the core 20 formed within the first cladding 30 of the optical amplifier 11. With butt-jointed coupling, waveguide branch 63 directly contacts waveguide 19 without any intermediate coupling device. Index matching fluid may be used to reduce reflection loss at the interface. The optical pump 50 emitted from a pump source 56 is butt-jointed coupled to waveguide coupling arm 62. The optical signal 71 emitted from signal source 70 is butt-jointed coupled to the waveguide coupling arm 61.

In alternative embodiments, other methods of coupling the optical pump 50 and the multiple-wavelength optical signal 71 to the core 20 of the waveguide 19 are used. Such coupling methods include lens assemblies, diffractive optical elements, directional couplers, grating couplers, Y-branch waveguides, beam-splitters and combinations thereof.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

We claim:

1. A flattened gain amplifier, comprising:
   a waveguide having a length and including a core doped with at least one species of rare earth ion, the rare earth ion having a gain profile with a first gain in a first wavelength band and a second gain in a second wavelength band;
   a first grating optically coupled to the core; and
   a reflective element optically coupled to the core;
   in which positions of the first grating and reflective element along the length respectively define a first amplifying length and a second amplifying length, the ratio of the first amplifying length to the second amplifying length being about equal to the ratio of the second gain to the first gain.

2. The amplifier of claim 1, in which: the waveguide additionally comprises an output endface; and the reflective element comprises a mirror on the output endface.

3. The amplifier of claim 1, in which the first grating comprises sub-gratings having peak reflectivities at different wavelengths.

4. The amplifier of claim 1, in which the reflective element comprises a second grating optically coupled to the core.

5. The amplifier of claim 1, in which the first grating comprises one of a Bragg grating, a long-period grating and a chirped grating.

6. The amplifier of claim 1, in which: the core is connected to receive an optical pump power and an optical signal; and the grating and the reflective element are structured to reflect respective wavelengths of the optical signal.

7. The amplifier of claim 6, in which the optical signal comprises optical signals having different wavelengths.

8. A flattened gain amplifier, comprising:
   a waveguide having a length and including a core doped with at least one species of rare earth ion, the rare earth ion having a gain profile with a first gain in a first wavelength band and a second gain in a second wavelength band, the core is connected to receive an optical pump power and an optical signal; and the grating and the reflective element are structured to reflect respective wavelengths of the optical signal, the optical signal comprising optical signals having different wavelengths;
   a first grating optically coupled to the core; and
   a reflective element optically coupled to the core; in which positions of the first grating and reflective element along the length respectively define a first amplifying length and a second amplifying length, the ratio of the first amplifying length to the second amplifying length being about equal to the ratio of the second gain to the first gain and
   further comprising: a first cladding; and a second cladding surrounding the first cladding, in which the grating is a first grating and is structured to couple the optical signal at a first wavelength fmm the core to the first cladding and in which the reflective element comprises a second grating structured to couple the optical signal at a first wavelength from the first cladding to the core.

9. The amplifier of claim 8, in which the first grating comprises first sub-gratings and the second grating comprises second sub-gratings, in which the first sub-gratings and the second sub-gratings are paired, and in which each pair of the first sub-gratings and second sub-gratings is structured to couple different wavelengths of optical signals to and from the first cladding.

10. The amplifier of claim 8, in which the first cladding is doped with $Er^{3+}$ in the range of 5 to 30 wt %.

11. The amplifier of claim 8, in which the first cladding is doped with $Er^{3+}$ the range of 5 to 30 wt % and $Yb^{3+}$ in the range of 7 to 35 wt %.

12. The amplifier of claim 1, in which the rare earth ion is $Er^{3+}$ in the range of 5 to 75 wt %.

13. The amplifier of claim 1, in which the at least one species of rare earth ion is $Er^{3+}$ and $Yb^{3+}$.

14. The amplifier of claim 1, in which the core includes silver atoms.

15. A flattened gain amplifier, comprising:
a waveguide having a length and including a core doped with at least one species of rare earth ion, the rare earth ion having a gain profile with a first gain in a first wavelength band and a second gain in a second wavelength band, the waveguide including an output endface;
a first grating optically coupled to the core; and
a reflective element comprising a mirror on the output endface optically coupled to the core; in which positions of the first grating and reflective element along the length respectively define a first amplifying length and a second amplifying length, the ratio of the first amplifying length to the second amplifying length being about equal to the ratio of the second gain to the first gain.

16. The amplifier of claim 15, in which the first grating comprises sub-gratings having peak reflectivities at different wavelengths.

17. The amplifier of claim 15, in which the reflective element comprises a second grating optically coupled to the core.

18. The amplifier of claim 15, in which the first grating comprises one of a Bragg grating, a long-period grating and a chirped grating.

19. The amplifier of claim 15, in which: the core is connected to receive an optical pump power and an optical signal; and the grating and the reflective element are structured to reflect respective wavelengths of the optical signal.

20. The amplifier of claim 19, in which the optical signal comprises optical signals having different wavelengths.

* * * * *